Aug. 30, 1960
A. J. GOLICK
2,950,708
VALVE LIFTERS
Filed March 30, 1959
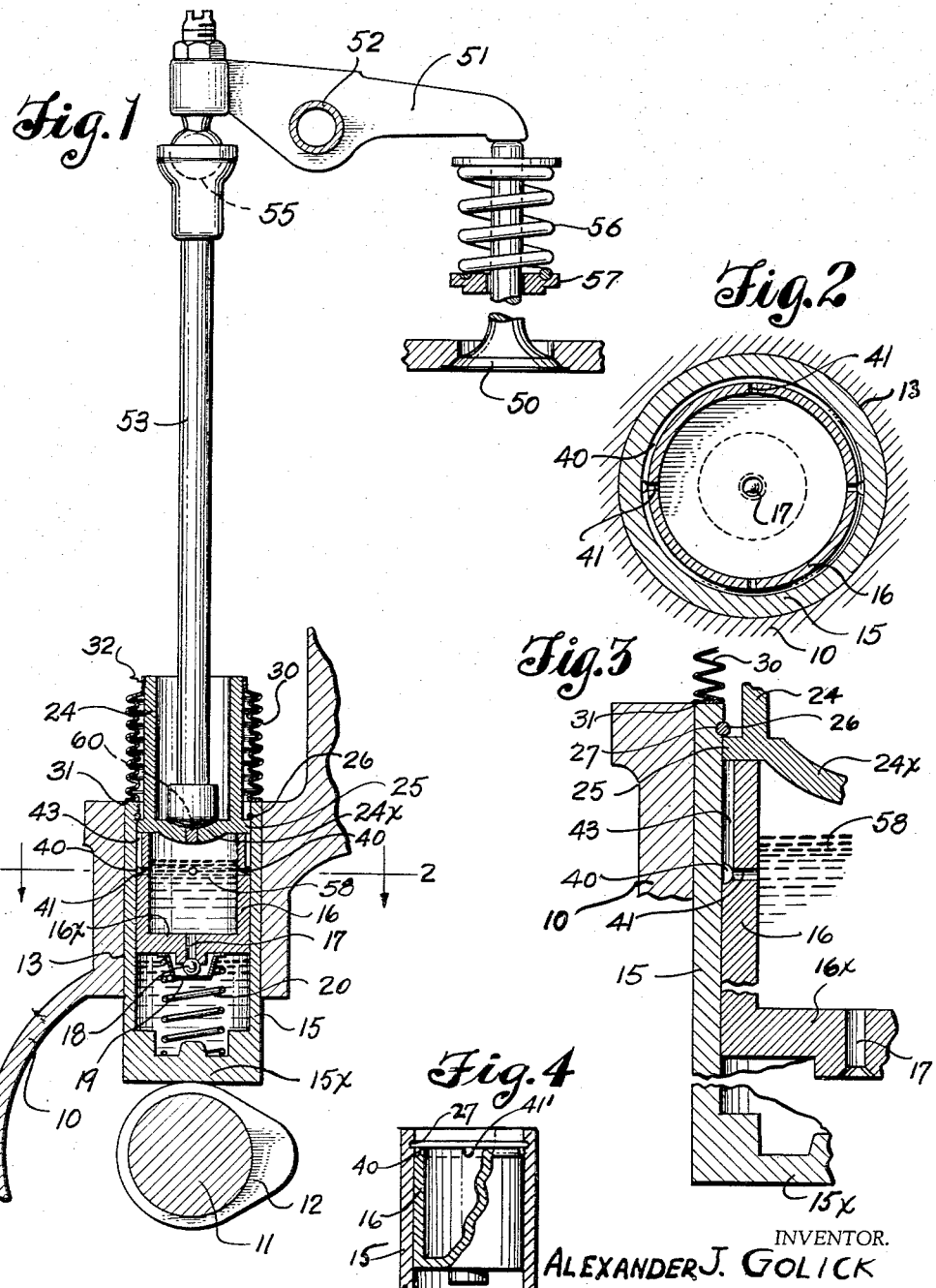
INVENTOR.
ALEXANDER J. GOLICK
BY
Robinson & Berry
ATTORNEYS United States Patent Office 2,950,708
Patented Aug. 30, 1960

2,950,708

VALVE LIFTERS

Alexander J. Golick, 7518 23rd NW., Seattle, Wash.

Filed Mar. 30, 1959, Ser. No. 802,806

8 Claims. (Cl. 123—90)

This invention relates to what are generally referred to in the automobile industry as "hydraulic valve lifters" or "hydraulic lash adjusters," and it has reference more particularly to novel improvements in such devices whereby they are made entirely "self-contained," that is, their hydraulic medium is hermetically sealed therein as distinguished from being continuously replenished or supplied from an outside source such as the pressure lubricating system or oil pump or present day automobiles.

Explanatory to the present invention, it will here be noted that hydraulic valve lifters, as ordinarily used in connection with operation of valves of the internal combustion engines of automobiles, trucks, etc., are supplied by the pressure lubricating system with operating oil drawn from the crank cases of the engines, for example, as in U.S. Patents Nos. 2,672,133 and 2,665,669 and they ride upon the cam shaft risers or cams and move reciprocally in their guides as the cam shafts rotate. They are, in all instances, subjected to the usual conditions of temperature, lubrication, sludge and contamination found in the average crank case. Further, it is of significance that the average crank case oil which is supplied to the cylinders of the valve lifters by any of the conventional means, constitutes the fluid medium which is so vital to the proper operation of the lifters. By reason of the use of crank case oil as the hydraulic medium, problems of contamination arise, and in addition thereto, there is the additional problem of providing a constant supply of oil as well as the proper mechanism and design that will insure its supply in an over abundance at all times.

It can further be understood that valve lifters as heretofore designed and employed, must of necessity utilize the crank case lubricant with its extreme variables, due to type, viscosity, purity and general conditions of the engine. Oil as found in the average engine crank case is usually far from ideal for optimum performance and maximum life of the delicate valve lifters. The replacement of worn and corroded lifters which results from use of such oil, is quite expensive and also is time consuming, and it is ironical that new valve lifters when installed as replacements are immediately subjected to all the adverse conditions previously existing in the crank case.

In view of the foregoing explanatory subject matter, it has been the principal object of this invention to provide hydraulic valve lifters that are charged with the necessary amount of a prepared or selected fluid lubricant that is best suited for their particular use, and which are sealed against entry or mixing with the selected fluid lubricant of any external contaminants, thereby eliminating the usual causes and avoiding the disadvantages and objectionable features that would result therefrom, or from any lack of operating supply of oil.

It is also an object of the present invention to provide valve lifters that embody only minor modifications in the main internal parts of conventional types of present day lifters, but which, in lieu of the usual supplying of oil thereto as through the rocker arms and push rods with which the lifters are associated, are charged with a sealed-in hydraulic medium that is maintained constant in quantity and quality.

More specifically stated, the objects and advantages of the present invention reside in the provision of a hydraulic valve lifter which, in addition to the usual main elements of such devices, includes an extension member of piston form, mounted on the upper end of the lifted body or cylinder, and seating upon the upper end of the piston or plunger, and about which extension member, a resilient cylindrical bellows is applied; this bellows being sealed at its upper and lower ends, respectively, to the extension member and to the cylinder thus to seal in the operating hydraulic medium as contained in the cylinder and piston without interfering with that relative movement of all parts that is necessary for the proper functioning of the lifter.

Further objects and advantages of the present invention reside in the details of construction of parts; in their assembled relationship and in the mode of use and functioning of the filter, as will hereinafter be fully described.

In accomplishing the above mentioned and other objects of the invention, I have provided the improved detains of construction, the preferred forms of which are illustrated in the accompanying drawings, wherein:

Fig. 1 is a sectional view taken in the axial line of the present form of hydraulic valve lifter, and showing the lifter as used in combination with a valve and the valve operating elements.

Fig. 2 is an enlarged, horizontal cross-sectional view, taken on line 2—2 in Fig. 1, showing the oil channels and ports of the piston member of the lifter.

Fig. 3 is an enlarged sectional detail, taken in a vertical plane and showing parts of the cylinder wall, the piston and the extension member.

Fig. 4 is a sectional detail of an alternative or modified form of construction.

Referring more in detail to the drawings:

In Fig. 1, 10 designates a part of the crank case housing of an internal combustion engine; 11 designates a rotatably driven cam shaft, mounted in the engine housing and equipped with a cam or riser 12. Directly above the cam shaft, the housing 10 is formed with a vertical cylindrical bore or guideway 13 in which a hydraulic valve lifter embodied by the present invention is reciprocally contained.

The present valve lifter comprises the body or cylinder 15; this being closed at its lower end by a wall 15x with a flat bottom surface that rides upon the cam 12. The cylinder 15 is of substantial length and contains coaxially therein, for limited reciprocal movement, a hollow plunger or piston 16 which is formed centrally in its lower end wall 16x with a port or passage 17. A ball check 18 is carried by the lower end wall of the piston and is adapted to close upwardly over the port.

It is shown in Fig. 1 that the ball 18 is operatively contained in a perforated ball retainer or cage 19 that is applied to the lower end of the plunger about the port entrance and that a coiled spring 20 is contained under compression between the lower end walls of the cylinder and plunger to apply lifting force to the plunger, as presently will be explained.

Seated against the upper end of the piston or plunger is a piston-like extension member 24 having an outside diameter that is slightly lesser than that of the plunger. This member is closed at its lower end by a downwardly cupped wall 24x. About its lower end the plunger has an annular shoulder 25, and a spring retainer ring 26 is applied within an internal groove 27 in the upper end portion of the cylinder 15 against which the shoulder can engage thus to limit the upward movement of the extension member and piston 16 under influence of spring 20.

Surrounding the cylindrical extension 24 is a resilient bellows 30 which, at its lower end, rests upon and is joined with and sealed, as at 31, to the upper end of the cylinder 15, and at its upper end is fitted about and sealed, as at 32, to the upper end portion of the extension 24. This bellows is preferably of metal, such as a copper alloy and has substantial flexibility and is designed to withstand the heat, pressure and vibration encountered in normal operation of the engine.

It is shown best in Figs. 2 and 3 that the sidewall portion of piston 16 is formed near its upper end with an external channel 40 that encircles the piston and with a plurality of ports 41 leading from the channel to the inside of the piston, thus to provide for return of hydraulic medium that may be forced upwardly between the piston and cylinder walls, to the interior of the piston. Also, the piston is formed with a plurality of shallow channels 43 that lead upwardly from the channel 40 to the upper end of the piston. By provision of such ports and channels, the hydraulic medium is permitted to circulate around the piston and back into the reservoir contained therein.

An alternative system, as shown in Fig. 4 of the drawings may be employed for better lubrication of the piston 16. In this alternative arrangement, a channel 40 is provided about the outside of the top edge of piston 16 and radial passages 41', of semi-circular cross-section are formed in its top edge.

In use of the present hydraulic lifter for the operation of an engine valve, an assembly of parts as shown in Fig. 1 may be used. In this view, 50 designates an engine valve; 51 a valve rocker arm pivoted on a shaft 52, and 53 designates a push rod that extends downwardly into and seats pivotally at its lower end against the bottom wall of the member 24, and at its upper end has a ball and socket connection, as at 55, with the rocker arm. A coil spring 56 applied about the valve stem and acting against a support 57 urges the valve 50 to its closed position.

To prepare the lifter for use, it is first charged with the required amount of a carefully prepared hydraulic medium, suitable for the present purpose, and then the device is properly sealed by use of the bellows-like device 30. The charging of the device with the medium, designated at 58, is preferably done through a port formed through in the base wall 24x of the extension member 24 and then the port, indicated in dotted lines at 60 in Fig. 1, is permanently sealed. Filling with oil or other medium would normally be to the extent indicated.

Assuming the lifter to be so prepared, and to be operatively associated with the valve actuating parts, as for example, those seen in Fig. 1, operation is as follows:

Assuming first, that the engine has been idle for some time and that valve 50, shown in Fig. 1, is open and that the valve lifter is collapsed to its shortest condition: As the engine starts, the valve is caused to close and the valve spring load is removed from the lifter. The spring 20 then operates to slightly lift the piston 16 in the cylinder 15 to take up all slack or clearances in the valve actuating mechanism. This lifting action permits oil to flow from the chamber of the piston 16, downwardly through passage 17, past ball check 18 into the pressure chamber in the lower end of the cylinder 15 to completely fill it. Then as the cam starts to raise the lifter, the ball check 18 operates to close passage 17. The trapped oil in the cylinder chamber then acts as a solid link, and causes the plunger or piston to be raised with the cylinder, thus to move the push rod 53 to open the valve 50.

During this above movement of the valve 50, a certain amount of oil may leak from the high pressure chamber of the cylinder along the piston wall. This will be caught in the annular channel 40 and returned into the piston chamber through ports 41 or passages 41'.

When cam 12 moves from the "up" position, the pressure on cylinder 15 is released allowing spring 20 to raise piston 16 to maintain zero back-lash and in so doing, the ball check 18 drops, opening port 17, allowing the fluid medium to flow downwardly from the reservoir or piston chamber into the cylinder chamber.

It can readily be seen that any minute speck of foreign matter in the fluid medium lodging between the ball check and its seat can render the device completely inoperative during the valve opening cycle, by permitting the fluid to be discharged from the lower cylinder chamber and into the piston chamber and thereby resulting in insufficient valve action and creating excessive noise.

In this device, the metal bellows 30 seals the lifter against liquid escape and it also seals it against the entry into the sealed-in liquid supply of external contaminants or foreign substances that would or could impair the efficiency of operation.

The bellows, due to its spring-like elasticity also permits the necessary relative movements of the cylinder, piston and extension member of the lifter and assists in preventing, along with spring 20, looseness and resultant chatter.

The present improvement additionally provides that the total vertical movement of piston 16 is reduced to from 15 to 50 thousandths of an inch, this being all that is necessary, to reduce movement in bellows 30 itself and preventing complete collapse of the lifter when under pressure for long periods. In present day lifters no apparent attempt has been made to limit this movement and as a result there is a tendency therein for them to "float" at high speeds, thus resulting in improper valve clearance and attendant malfunctioning.

Since the present invention provides for the sealing in of the operating liquid, the liquid employed can be formulated for this special use. It can consist of a single component, a silicone, a non-foaming oil, or an anti-corrosion liquid, or a blend of several ingredients, as may be required to produce a fluid with an ideal and stable viscosity and composition, with respect to temperature and time, of low or predetermined vapor pressure, anti-corrosive properties and low specific gravity. The bellows-like seal 30 may be employed and secured in various ways such as by soldering or by use of various forms of removable clamps or retainers.

The inherent advantages of the present sealed or self-contained unit resides in the fact that it permits a substantial reduction in the size of its components. Thus, its overall mass and weight can be reduced to avoid high inertial forces and sluggish operation, especially at high speeds.

The method of manufacture and hermetically sealing the unit is subject to considerable variation by persons skilled in the art without departing from the spirit of the invention, and it is not the intent that the invention be limited to the disclosure herein illustrated and described.

What I claim as new is:

1. A valve lifter wherein the parts are permanently joined and hermetically sealed and are a continuous metallic unit, said valve lifter comprising a cylinder having a closing wall at its lower end, a piston telescopically fitted within said cylinder and providing a pressure chamber between said closing wall and the lower end of said piston, a hydraulic medium in said pressure chamber and a fluid tight expandable means interconnected between the upper end of the piston and the upper end of the cylinder hermetically sealing the hydraulic medium in the lifter unit.

2. A valve lifter as in claim 1 wherein said piston includes a closing wall at its lower end, a port through said piston closing wall and a check valve for said port adapted to close incident to increased pressure in said pressure chamber.

3. A valve lifter as in claim 2 wherein spring means is contained in said pressure chamber and acts against the closing wall of said cylinder and the closing wall of said piston.

4. A valve lifter as in claim 2 wherein the piston is hollow and includes a reservoir for the hydraulic medium and ports through the sidewalls of said piston intermediate the ends thereof.

5. A valve lifter as in claim 4 wherein the piston includes an external, circumferential channel in radial alignment with said ports.

6. A valve lifter as in claim 1 including means affixed to said cylinder and engageable by said piston to limit the upward movement of said piston.

7. A valve lifter as in claim 1 wherein the fluid tight expandable means is a bellows.

8. A valve lifter as in claim 1 wherein the hydraulic medium is a fluid having the properties of being anti-corrosive, having a stable viscosity, a low vapor pressure and a low specific gravity.

References Cited in the file of this patent

UNITED STATES PATENTS 2,689,555     Van Slooten _____ Sept. 21, 1954